US009605196B2

(12) United States Patent
Biggerstaff et al.

(10) Patent No.: US 9,605,196 B2
(45) Date of Patent: Mar. 28, 2017

(54) LUBRICITY AGENTS TO INCREASE PUMP EFFICIENCY IN HYDRATE INHIBITOR APPLICATIONS

(71) Applicant: Baker Hughes Incorporated, Houston, TX (US)

(72) Inventors: Paul J. Biggerstaff, Sugar Land, TX (US); Marc N. Lehmann, Houston, TX (US); Anna M. Dhuet, Richmond, TX (US); Jerry J. Weers, Richmond, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 393 days.

(21) Appl. No.: 13/671,374

(22) Filed: Nov. 7, 2012

(65) Prior Publication Data

US 2013/0130941 A1    May 23, 2013

Related U.S. Application Data

(60) Provisional application No. 61/561,010, filed on Nov. 17, 2011.

(51) Int. Cl.
*C09K 8/52* (2006.01)

(52) U.S. Cl.
CPC ............ *C09K 8/52* (2013.01); *C09K 2208/22* (2013.01); *C09K 2208/34* (2013.01)

(58) Field of Classification Search
CPC ... C09K 8/52; C09K 2208/22; C09K 2208/34
USPC .......................................................... 507/90
See application file for complete search history.

(56) References Cited

U.S. PATENT DOCUMENTS

| | | | |
|---|---|---|---|
| 4,375,360 A | 3/1983 | Washecheck et al. | |
| 4,609,376 A | 9/1986 | Craig et al. | |
| 4,668,245 A | 5/1987 | Schieler | |
| 7,867,295 B2 | 1/2011 | Schield | |
| 2004/0164278 A1 | 8/2004 | Dahlmann et al. | |
| 2006/0094913 A1* | 5/2006 | Spratt | C09K 8/52 585/15 |
| 2006/0166835 A1 | 7/2006 | Yang et al. | |
| 2008/0113878 A1 | 5/2008 | Leinweber et al. | |
| 2008/0312478 A1 | 12/2008 | Talley et al. | |
| 2010/0107484 A1 | 5/2010 | Vilardo | |

(Continued)

FOREIGN PATENT DOCUMENTS

EP    0286336 A1    10/1988

OTHER PUBLICATIONS

Kelland, Malcolm A., "History of the Development of Low Dosage Hydrate Inhibitors," Energy & Fuels, vol. 20, No. 3, pp. 825-847 (May/Jun. 2006).

(Continued)

*Primary Examiner* — Frances Tischler
(74) *Attorney, Agent, or Firm* — Mossman Kumar & Tyler PC

(57) ABSTRACT

Saturated and unsaturated carboxylic fatty acids and alkylamine salts, alkyl esters and alkyl amide derivatives of these fatty acids are effective in improving the lubricity of hydrate inhibitor formulations, thereby effectively reducing the level of wear on moving parts of a pump under a load during pumping of the hydrate inhibitor formulation, for instance into an umbilical for a subsea hydrocarbon production operation.

14 Claims, 1 Drawing Sheet

Products A and B Lubricity Performance Graph

(56) References Cited

U.S. PATENT DOCUMENTS

2012/0078021 A1* 3/2012 Durham et al. .................. 585/4

OTHER PUBLICATIONS

Lacey, Pi et al., "Fuel Lubricity Reviewed," SAE Paper Series 982567 (Oct. 1998).

* cited by examiner

Products A and B Lubricity Performance Graph
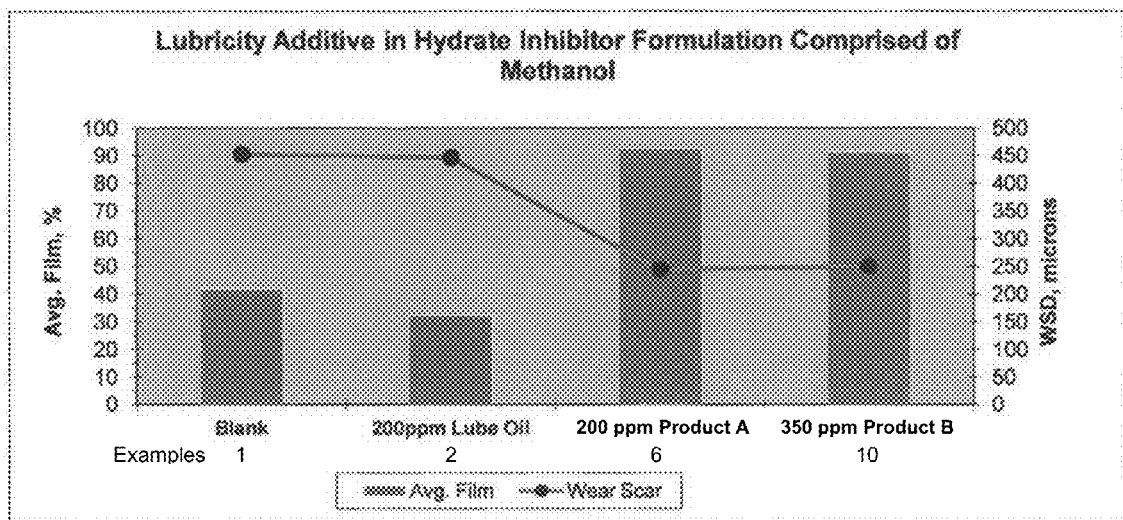

LUBRICITY AGENTS TO INCREASE PUMP EFFICIENCY IN HYDRATE INHIBITOR APPLICATIONS

CROSS-REFERENCE TO RELATED APPLICATION

This application claims the benefit of U.S. Provisional Patent Application Ser. No. 61/561,010 filed Nov. 17, 2011, incorporated herein by reference in its entirety.

TECHNICAL FIELD

The present invention relates to pumping hydrate inhibitors, and more particularly relates in one non-limiting embodiment to lubricity agents used to increase the efficiency of pumping hydrate inhibitors.

TECHNICAL BACKGROUND

A number of hydrocarbons, especially lower-boiling light hydrocarbons, in subterranean formation fluids or natural gas are known to form hydrates in conjunction with the water present in the system under a variety of conditions—particularly at a combination of low temperature and high pressure (pressure and temperature are system-specific for the formation of gas hydrates). The hydrates usually exist in solid forms that are essentially insoluble in the fluid itself. As a result, any solids in a subterranean formation or natural gas fluid are at least a nuisance for production, handling and transport of these fluids. It is not uncommon for hydrate solids (or crystals) to cause plugging and/or blockage of pipelines or transfer lines or other conduits, valves and/or safety devices and/or other equipment, resulting in shutdown, loss of production and risk of explosion or unintended release of hydrocarbons into the environment either on land or off-shore. Accordingly, hydrocarbon hydrates have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly $C_1$ (methane) to $C_4$ hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulfide are known to form hydrates under the proper conditions.

There are two broad techniques used to overcome or control the hydrocarbon hydrate problems, namely the use of thermodynamic inhibitors and Low Dosage Hydrate Inhibitors (LDHIs). LDHIs are referred to as such due to the low volume required to treat production streams when compared to thermodynamic inhibitors. For the thermodynamic approach, there are a number of reported or attempted methods, including water removal, increasing temperature, decreasing pressure, addition of "antifreeze" to the fluid and/or a combination of these. The types of "antifreeze" additives or thermodynamic hydrate inhibitors (THIs) include, but are not necessarily limited to methanol, ethanol, monoethylene glycol (MEG), triethylene glycol (TEG), and combinations thereof. The LDHI approach is further split into two areas, Anti-agglomerants (AAs) and kinetic hydrate inhibitors (KHIs). AAs prevent smaller hydrocarbon hydrate crystals from agglomerating into larger ones and allow a mass of hydrates, sometimes referred to as a hydrate slurry, to be transported along the conduit. KHIs however inhibit, retard and/or prevent initial hydrocarbon hydrate crystal nucleation; and/or crystal growth. Thermodynamic and kinetic hydrate control methods may be used in conjunction.

Kinetic efforts to control hydrates have included the use of different materials as inhibitors. For instance, onium compounds with at least four carbon substituents are used to inhibit the plugging of conduits by gas hydrates. Additives such as polymers with lactam rings have also been employed to control clathrate hydrates in fluid systems. LDHIs are relatively expensive materials, and it is always advantageous to determine ways of lowering the usage levels of these hydrate inhibitors while maintaining effective hydrate inhibition.

In oilfield production applications, especially offshore applications, it is common practice to pump thermodynamic inhibitors or a combination of low dose hydrate inhibitors and thermodynamic inhibitors such as methanol or ethanol subsea to inhibit the formation of natural gas hydrates plugs. Compositions containing thermodynamic inhibitors such as methanol and/or ethanol have poor inherent lubricity properties, which mean they provide very little boundary lubrication to moving parts within the injection pumping systems that are under load. These moving parts can comprise the ball valves in check valves or the pump packing seals.

Poor lubrication may cause general wear fatigue of pump moving parts and can lead to a relatively minor problem such as reduced pumping efficiency to a worst case scenario of catastrophic pump failure. These pump failures can be costly not only in terms of pump replacement but also in terms of a lack of flow assurance which can result in a shut-in of production and costs associated with deferred production. In some hydrate inhibitor applications, lubricant oil is injected into the hydrate inhibitor formulation to help reduce pump wear. However, conventional lubricant oil is not very soluble in compositions containing alcohols such as methanol or ethanol and it does not perform very well at the low concentrations required to keep it soluble. Currently no commercial products exist for reducing friction and the associated wear in hydrate inhibitor formulations that can contain methanol and/or ethanol. Thus, there exists a need for an effective specialty chemical additive that can either be injected stand-alone or blended into the hydrate inhibitor formulation as a package.

It would be desirable in the art of pumping a hydrate inhibitor composition to provide compositions and methods for pumping such compositions so that pumping efficiency and the wear on moving parts may be improved.

SUMMARY

There is provided, in one non-limiting form, a method of pumping a hydrate inhibitor composition, where the method comprises adding to the hydrate inhibitor composition an effective amount to increase lubricity of at least one lubricity agent that includes, but is not necessarily limited to, at least one C1-C36 fatty acid, at least one derivative of a C1-C36 carboxylic fatty acid and combinations thereof. The method additionally comprises pumping the hydrate inhibitor composition containing the lubricity agent.

There is also provided in an alternative non-restrictive embodiment, a hydrate inhibitor composition having at least one hydrate inhibitor and an effective amount to increase lubricity of the hydrate inhibitor composition of at least one lubricity agent that includes, but is not necessarily limited to, at least one C1-C36 carboxylic fatty acid, at least one derivative of a C1-C36 carboxylic fatty acid and combinations thereof. The at least one lubricity agent is different from the at least one hydrate inhibitor.

BRIEF DESCRIPTION OF THE DRAWINGS

FIG. 1 is a chart of lubricity additive in a hydrate inhibitor formulation comprised of methanol for a blank and three lubricity additives indicating average film % and the measured wear scar diameter (WSD) for each.

DETAILED DESCRIPTION

It has been discovered that saturated and unsaturated carboxylic fatty acids, in a non-limiting instance oleic acid, and derivatives thereof are effective in improving the lubricity of hydrate inhibitor formulations, thereby reducing the level of wear on moving parts under a load. These carboxylic fatty acids may be saturated, unsaturated or blends thereof. These carboxylic fatty acids can be derived from natural fats and oils or may be processed-derived acids such as tall oil fatty acids (TOFAs). They can be monomeric, oligomeric or blends thereof and they can range in carbon numbers between C1 independently to C36. In an alternative embodiment, the carbon numbers may range from C10 independently to C18. These carboxylic acids may be straight chained or branched.

Alkylamine or alkanolamine salts of these fatty acids are a suitable derivative in one non-limiting embodiment. Amines that can be blended into these carboxylic acids include primary, secondary and tertiary amines which may be alicyclic, suitably a di-methylcyclohexylamine (DM-CHA), heterocyclic, aromatic or branched. These may be a single amine or a polyamine.

Other derivatives of the saturated or unsaturated C1-C36 carboxylic fatty acid include, but are not necessarily limited to, imidazolines, anhydrides, alkyl or alkylphenol esters, and alkyl or alkanol amides of these fatty acids. In the term "alkylamine", the term alkyl is defined as a straight, branched or cyclic alkyl of from 1 independently to about 18 carbon atoms; alternatively from 4 independently to about 8 carbon atoms.

In the terms "alkyl or alkylphenol ester" and "alkyl or alkanol amide", the term alkyl is defined as a straight, branched or cyclic alkyl of from 1 independently to about 54 carbon atoms; alternatively from 18 independently to about 36 carbon atoms. As used herein with respect to ranges, the word "independently" means that any lower threshold may be used together with any upper threshold to form an acceptable alternative range.

These carboxylic acids and their amine salts and other derivatives are soluble in hydrate compositions containing methanol and/or ethanol and can be added into the formulation separately or as a blend component at rates between about 25 ppm independently to about 20,000 ppm; alternatively from about 100 ppm independently to about 500 ppm.

The lubricity agents herein may be used in hydrate inhibitor composition having a hydrate inhibitor selected from the group consisting of 0.01 to 99.99 vol % of an alcohol selected from the group consisting of methanol, ethanol, and combinations thereof, 0.01 to 99.99 vol % of a LDHI, which may be AAs and/or KHIs. Hydrate inhibitors which may be used in the methods and compositions herein also include the ICE-CHEK™ hydrate inhibitors from BJ Services. The ICE-CHEK™ hydrate inhibitors are made from glycol amines (including, but not necessarily limited to glycol amines, such as the JEFFAMINE® polyetheramines available from Huntsman Corporation, such as JEFFAMINE D-230, D-400 and EDR-148 polyetheramines) in methanol, ethanol or ethylene glycol. It is expected that adding the C1-C36 to these latter products would result in the formation of a salt between the acid and the amines in the ICE-CHEK™ hydrate inhibitors.

It will be appreciated that the hydrate inhibitor compositions described herein may be used to prevent the formation of hydrates in the first place and/or at least partially or completely dissolve or remove hydrate blockages or depositions. Using THIs to facilitate at least partial dissolution of hydrate blockages is contemplated along with increasing pump efficiency at the same time. It will be appreciated that it is not necessary to completely remove the hydrate blockage or deposit for the method to be considered successful, only that some of the blockage or deposit is removed to improve flow.

It is known to use lubricity agents for fuel compositions containing alcohols; however the requirement for lubricity in these systems differs from those where alcohols may be used in hydrate inhibition systems. Firstly, in the combustion process the alcohol in the fuel composition is injected during an intake stroke or suction stroke because the piston moves to the maximum volume position (downward direction in the cylinder). The inlet valve opens as a result of piston movement, and under negative pressure the vaporized fuel mixture enters the combustion chamber. In contrast, for hydrate inhibitor deployment the formulation containing either methanol and/or ethanol is under a constant positive pressure load to overcome the production well pressure and avoid formulation vaporization.

Secondly, the additives in fuels are often used to prevent wear arising from the products of alcohol combustion which include formaldehyde and formic acid which leads to corrosion of the piston seals and upper pistons, which is not a concern in pumping hydrate inhibitor compositions. Thirdly, the temperatures of the applications are significantly different. In combustion engines the fuel is heated to high temperatures while in hydrate inhibitor deployment systems the temperatures can be very low. Pumps that are deployed subsea may be at temperatures as low as about 4° C., alternatively in a range from about 50 to about −5° C., whereas such pumps could also be employed at moderate temperatures (about 80-100° C.) if employed in topsides operations.

Fourthly, the additives contained within the hydrate formulation are required to be cold stable so that they do not precipitate during the deployment of the formulation under the cold conditions experienced by the umbilical at ocean floor temperatures (about 4° C.); for instance at a range from about 50 to about −5° C. In summary, one having ordinary skill in the art knowing of the use of these carboxylic fatty acids in alcohol fuels would not expect them to be suitable lubricity agents for hydrate inhibitor compositions given the many differences in the disparate applications.

The invention will now be described with reference to particular Examples which are not intended to limit the invention but rather simply to illuminate it further.

EXAMPLES 1-12

Lubricity testing using a High Frequency Reciprocating Rig (HFRR) demonstrated the efficacy of adding oleic acid to a hydrate inhibitor formulation containing methanol. By adding 200 ppm of oleic acid, the average film build up on the metal surface (surface area) more than doubled from 41% to 90+%, the corresponding coefficient of friction was lowered by 30% and the resultant wear scar created by the moving parts of the rig on a steel disc reduced by as much as 40-45%.

Table 1 presents a summary of lubricity data for a hydrate inhibitor composition that is essentially all methanol. In addition to the blank, a conventional lubricating oil and an oilfield corrosion inhibitor were used along with polyglycol, all as comparisons. Oleic acid (Product A) and an amine (DMCHA) salt of oleic acid (Product B) gave excellent results; note particularly Examples 6 and 10, which are plotted along with the blank (Ex. 1) and 200 ppm lube oil (Ex. 2) in FIG. 1.

TABLE I

Products A and B Methanol Lubricity Summary

| Ex. | Additive | Dosage, ppm | WSD, microns | Average Film % | Average Friction |
|---|---|---|---|---|---|
| 1 | Blank | — | 453 | 42.14 | 0.206 |
| 2 | Lube Oil | 200 | 447 | 32.32 | 0.207 |
| 3 | Polyglycol | 200 | 486 | 59.3 | 0.225 |
| 4 | Oilfield corrosion inhibitor | 200 | 430 | 25.62 | 0.162 |
| 5 | Product A | 100 | 414 | 49.1 | 0.21 |
| 6 | Product A | 200 | 245 | 92.58 | 0.136 |
| 7 | Product A | 500 | 235 | 97.41 | 0.136 |
| 8 | Product A | 1000 | 257 | 70.17 | 0.155 |
| 9 | Product B | 200 | 387 | 8.9 | 0.215 |
| 10 | Product B | 350 | 251 | 91.35 | 0.136 |
| 11 | Product B | 500 | 265 | 86.34 | 0.1615 |
| 12 | Product B | 10000 | 282 | 68.29 | 0.151 |

It appears that the Average Film result for Example 9 of 8.9% is an outlier compared to the results for the other Examples, for an unknown reason.

EXAMPLES 13-15

The use of a corrosion inhibitor effective in ethanol and an ester-based (monoethylene glycol dimerate) lubricity additive in diesel fuel was also evaluated. Product A and Product B also outperformed both of these as well. Compare the data in Table II with that in Table I.

TABLE II

Comparative Corrosion Inhibitor Products Lubricity Summary

| Ex. | Additive | Dosage, ppm | WSD, microns | Average Film % | Average Friction |
|---|---|---|---|---|---|
| 13 | Blank | — | 453 | 42.14 | 0.206 |
| 14 | Ethanol corrosion inhibitor | 200 | 420 | 32.51 | 0.188 |
| 15 | Ester-based lubricity additive | 200 | 401 | 57.61 | 0.195 |

It is to be understood that the invention is not limited to the exact details of carboxylic fatty acids, derivatives thereof, sources thereof, thermodynamic inhibitors, LDHIs, AAs, KHIs, etc. shown and described, as modifications and equivalents thereof will be apparent to one skilled in the art. The invention is therefore to be limited only by the scope of the appended claims. Further, the specification is to be regarded in an illustrative rather than a restrictive sense. For example, specific combinations of carboxylic fatty acids, derivatives thereof, dosages thereof, hydrate inhibitor compositions, and the like falling within the described parameters herein, but not specifically identified or tried in a particular composition method or apparatus, are expected to be within the scope of this invention.

The terms "comprises" and "comprising" used in the claims herein should be interpreted to mean including, but not limited to, the recited elements.

The present invention may suitably comprise, consist or consist essentially of the elements disclosed and may be practiced in the absence of an element not disclosed. For instance, the method of pumping a hydrate inhibitor composition may consist of or consist essentially of adding to the hydrate inhibitor composition an effective amount to increase lubricity of a lubricity agent selected from the group consisting of at least one C1-C36 carboxylic fatty acid, an alkylamine salt of a C1-C36 fatty acid, an alkyl ester of a C1-C36 fatty acid, an alkylphenol ester of a C1-C36 fatty acid, an alkanolamine salt of a C1-C36 fatty acid, an imidazoline salt of a C1-C36 fatty acid, an anhydride salt of a C1-C36 fatty acid, an alkanol amide of a C1-C36 fatty acid, an alkyl amide of a C1-C36 fatty acid, a polyetheramine salt of a C1-C36 fatty acid, and combinations thereof; and pumping the hydrate inhibitor composition containing the lubricity agent. In another instance, a hydrate inhibitor composition may consist of or consist essentially of at least one hydrate inhibitor and an effective amount to increase lubricity of the hydrate inhibitor composition of at least one lubricity agent selected from the group consisting of at least one C1-C36 carboxylic fatty acid, an alkylamine salt of a C1-C36 fatty acid, an alkyl ester of a C1-C36 fatty acid, an alkylphenol ester of a C1-C36 fatty acid, an alkanolamine salt of a C1-C36 fatty acid, an imidazoline salt of a C1-C36 fatty acid, an anhydride salt of a C1-C36 fatty acid, an alkanol amide of a C1-C36 fatty acid, an alkyl amide of a C1-C36 fatty acid, a polyetheramine salt of a C1-C36 fatty acid, and combinations thereof and combinations thereof. In these embodiments, the lubricity agent is different from the at least one hydrate inhibitor.

What is claimed is:

1. A method of pumping a hydrate inhibitor composition, the method comprising:
    adding to the hydrate inhibitor composition an effective amount to increase lubricity of at least one lubricity agent selected from the group consisting of a C1-C36 carboxylic fatty acid, an alkylamine salt of a C1-C36 fatty acid, an alkyl ester of a C1-C36 fatty acid, an alkylphenol ester of a C1-C36 fatty acid, an alkanolamine salt of a C1-C36 fatty acid, an imidazoline salt of a C1-C36 fatty acid, an anhydride salt of a C1-C36 fatty acid, an alkanol amide of a C1-C36 fatty acid, an alkyl amide of a C1-C36 fatty acid, a polyetheramine salt of a C1-C36 fatty acid, and combinations thereof; and
    pumping the hydrate inhibitor composition containing the lubricity agent;
    where the hydrate inhibitor composition consists essentially of:
        an alcohol hydrate inhibitor selected from the group consisting of methanol, ethanol, monoethylene glycol, triethylene glycol and combinations thereof; and
        about 25 ppm to about 20,000 ppm of the lubricity agent;
    where the method has an absence of composition vaporization.

2. The method of claim 1 where the fatty acid of the lubricity agent is derived from naturally-occurring fats, naturally-occurring oils, oligomers of naturally-occurring fats, oligomers of naturally-occurring oils, and combinations thereof.

3. The method of claim 1 where the fatty acid is tall oil fatty acid (TOFA).

4. The method of claim 1 where the method further comprises contacting at least one hydrate blockage with the hydrate inhibitor composition to at least partially dissolve the at least one blockage.

5. A method of pumping a hydrate inhibitor composition, the method comprising:
  adding to the hydrate inhibitor composition from about 25 ppm to about 20,000 ppm to increase lubricity of at least one lubricity agent selected from the group consisting of a C1-C36 carboxylic fatty acid, an alkyl ester of a C1-C36 fatty acid, an alkylphenol ester of a C1-C36 fatty acid, an anhydride salt of a C1-C36 fatty acid, an alkanol amide of a C1-C36 fatty acid, an alkyl amide of a C1-C36 fatty acid, and combinations thereof;
  pumping the hydrate inhibitor composition containing the lubricity agent; and
  contacting at least one hydrate blockage with the hydrate inhibitor composition to at least partially dissolve the blockage;
where the hydrate inhibitor composition consists of:
  an alcohol hydrate inhibitor selected from the group consisting of methanol, ethanol, monoethylene glycol, triethylene glycol and combinations thereof; and
  about 25 ppm to about 20,000 ppm of the lubricity agent;
where the composition has an absence of corrosion inhibitors.

6. The method of claim 5 where the fatty acid of the lubricity agent is derived from naturally-occurring fats, naturally-occurring oils, oligomers of naturally-occurring fats, oligomers of naturally-occurring oils, and combinations thereof.

7. The method of claim 5 where the fatty acid is tall oil fatty acid (TOFA).

8. A method of pumping a hydrate inhibitor composition, the method comprising:
  adding to the hydrate inhibitor composition an effective amount to increase lubricity of at least one lubricity agent selected from the group consisting of a C1-C36 carboxylic fatty acid, an alkyl ester of a C1-C36 fatty acid, an alkylphenol ester of a C1-C36 fatty acid, and combinations thereof; and
  pumping the hydrate inhibitor composition containing the lubricity agent;
where the hydrate inhibitor composition comprises:
  an alcohol hydrate inhibitor selected from the group consisting of methanol, ethanol, monoethylene glycol, triethylene glycol and combinations thereof; and
  about 25 ppm to about 500 ppm of the lubricity agent.

9. The method of claim 8 where the at least one lubricity agent is a C1-C36 carboxylic fatty acid.

10. The method of claim 8 where the hydrate inhibitor composition consists essentially of:
  an alcohol hydrate inhibitor selected from the group consisting of methanol, ethanol, monoethylene glycol, triethylene glycol and combinations thereof; and
  about 25 ppm to about 500 ppm of the lubricity agent.

11. The method of claim 8 where the hydrate inhibitor composition consists of:
  an alcohol hydrate inhibitor selected from the group consisting of methanol, ethanol, monoethylene glycol, triethylene glycol and combinations thereof; and
  about 25 ppm to about 500 ppm of the lubricity agent.

12. The method of claim 8 where the fatty acid of the lubricity agent is derived from naturally-occurring fats, naturally-occurring oils, oligomers of naturally-occurring fats, oligomers of naturally-occurring oils, and combinations thereof.

13. The method of claim 8 where the fatty acid is tall oil fatty acid (TOFA).

14. The method of claim 8 where the method further comprises contacting at least one hydrate blockage with the hydrate inhibitor composition to at least partially dissolve the at least one blockage.

* * * * *